UNITED STATES PATENT OFFICE.

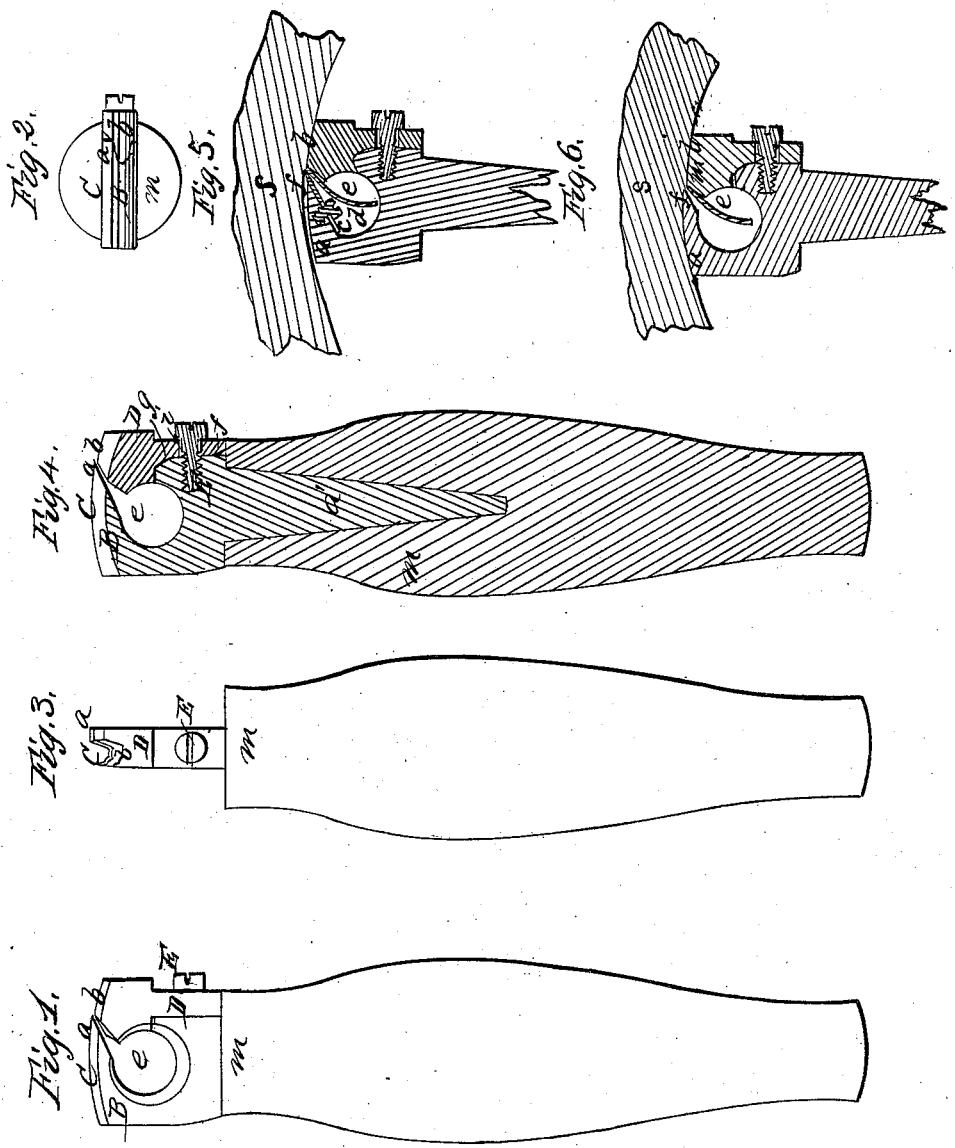

ISAAC A. DUNHAM, OF NORTH BRIDGEWATER, MASSACHUSETTS.

SHOEMAKER'S EDGE-PLANE.

Specification of Letters Patent No. 15,176, dated June 24, 1856.

*To all whom it may concern:*

Be it known that I, ISAAC A. DUNHAM, of North Bridgewater, in the county of Plymouth and State of Massachusetts, have invented an Improved Instrument or Tool for Molding or Making Moldings on the Edges of the Soles of Boots and Shoes; and I do hereby declare that the same is fully described and represented in the following specification and the accompanying drawings, in which—

Figure 1 is a side elevation or view of said tool; Fig. 2, an edge or top view of it; Fig. 3, another side view of it, in which its molding edge is exhibited endwise. Fig. 4 is a vertical and longitudinal section of the tool.

In these drawings B, denotes a piece of steel or metal formed with an acute angular cutter $a$, and with a portion, $e$, of its molding edge C, to run in contact with the surface or edge of a sole to be molded.

The molding edge, C, of the tool is constructed with a form whose transverse section is in reverse of that, which is to be produced on the edge of the sole—the external surface of the molding edge being made smooth and rounded so that it may also be used to polish or smooth down the surface of the molding formed by the cutter, $a$. By constructing the molding cutter in manner above described, the grinding of it, when it becomes dull, is a matter of much ease, as it only becomes necessary to whet or reduce it on its inner or plane surface. Another portion, $b$, of the molding surface, C, or that portion which is arranged in front of the cutter is made movable, or is formed upon a movable and adjustable gage, D, which is constructed and applied to the part B, and secured thereto by a set screw, E, as seen in the drawings. This screw extends through an elongated hole or slot, $i$, made through the gage, so as to allow of the latter being moved toward and away from the cutter, the gage sliding on a guide fin or tongue, $f$, which extends from the part B, and enters a corresponding groove, $g$, made in the gage. A throat or passage, E, extends through the tool as seen in the drawings.

The ability of the tool to cut a molding or remove a shaving from the edge of a sole, depends on the relative positions of the movable and stationary parts of its molding surface or edge, C, that is to say, if the movable part of it is adjusted below the stationary part, the tool will be capable of performing the operation of molding. From the part, B, a shank, $a$, extends and enters a handle $m$.

In using the tool, a workman grasps it by the handle, and applies the molding edge against the edge of the sole to be reduced. By successive movements of the tool—forward and backward, he will not only be able to reduce the edge of the sole to the shape required, but at the same time or subsequently, he can polish or smooth it.

In Fig. 5, I have endeavored to illustrate the manner in which a common molding tool having an adjustable cutter operates with respect to the edge of a sole, or piece of leather. In Fig. 6, I have also illustrated the mode of operation of my improved tool under like circumstances.

In Fig. 5, the molding edge, $a$, $b$, is perfectly stationary, while a cutter, $c$, is so applied within the throat, $d$, and to the edge, $a$, $b$ as to be capable of being set in such manner, as to project from the edge $a$, $b$, as seen in said Fig. 5.

In cutting with a tool, of this description, that portion of the molding edge, which is in front of the cutter rests in contact with the sole S, when the tool is cutting a shaving, $e'$, therefrom—the part, $a$, $f$, of the molding edge not being in contact (except it may possibly be at the end, $a$, thereof) with the sole. Consequently, the part, $a$, $f$, of the molding edge can serve with little effect to polish or smooth down the edge of the sole, while the shaving is being removed from it. Nor does it serve to good advantage to steady the cutter, which in consequence of not being well steadied in its rear, is liable either to cut irregularly or to pass out of the leather, it being difficult to maintain it therein.

My improved tool while cutting a sole has the whole of its molding surface or edge resting in contact with it—that is to say, the stationary part, $a$, $f$, as well as the movable or adjustable part, $m$, $b$, (see Fig. 6) will bear upon the sole S, while the shaving, $e$, is being removed and in consequence thereof the leather will be firmly held or supported both in front and in rear of the shaving, so that the cutter at, $f$, (see Fig. 6,) can be moved regularly through the leather, the part, $a$, $f$, serves not only to smooth the surface of the leather but to operate in connection with the part, $m$, $b$, to advantageously guide the cutter.

When a movable cutter of the kind shown at, *e*, in Fig. 5 is employed, shavings of leather are apt to become clogged between the bevel of its edge and the angular part of the stock to which the cutter is secured, the same often proving a serious interruption to the working of the tool. Nothing of the kind can take place with my improved tool.

I do not claim a molding stock formed with a throat so as to receive a movable and adjustable molding cutter; nor do I claim so making a cutter that its molding surface and cutting edge shall be made in one piece of metal, but What I do claim is—

My improved tool having part of its molding edge stationary and formed with a cutting edge as specified, and the other part of said molding edge made movable with respect to the first as specified, and so that while cutting with the tool, the molding surfaces of both parts may rest in contact with the material, which is to be cut my tool enabling me also to polish the reduced surface while a shaving is being removed.

In testimony whereof I have hereunto set my signature this twenty fifth day of February A. D. 1856.

ISAAC A. DUNHAM.

Witnesses:
R. H. Eddy,
F. P. Hale, Jr.